US012673745B1

(12) United States Patent
Chiang

(10) Patent No.: US 12,673,745 B1
(45) Date of Patent: Jul. 7, 2026

(54) TRANSMISSION SPROCKET

(71) Applicant: TIEN HSIN INDUSTRIES CO., LTD., Taichung City (TW)

(72) Inventor: Meng-Hua Chiang, Taichung City (TW)

(73) Assignee: TIEN HSIN INDUSTRIES CO., LTD., Taichung City (TW)

( * ) Notice: Subject to any disclaimer, the term of this patent is extended or adjusted under 35 U.S.C. 154(b) by 0 days.

(21) Appl. No.: 19/218,397

(22) Filed: May 26, 2025

(51) Int. Cl.
B62M 9/10 (2006.01)

(52) U.S. Cl.
CPC ..................................... B62M 9/10 (2013.01)

(58) Field of Classification Search
CPC ....................................................... B62M 9/10
See application file for complete search history.

(56) References Cited

U.S. PATENT DOCUMENTS

| | | | | |
|---|---|---|---|---|
| 4,475,894 | A * | 10/1984 | Sugino | B62M 9/105 474/144 |
| 6,475,110 | B1 * | 11/2002 | Yamanaka | B62M 9/105 474/144 |
| 7,503,864 | B2 * | 3/2009 | Nonoshita | B62M 9/105 474/160 |
| 7,686,721 | B2 * | 3/2010 | Tabe | B62M 9/105 474/116 |
| 7,753,815 | B2 * | 7/2010 | Saifuddin | B62M 9/105 474/151 |

| | | | | |
|---|---|---|---|---|
| 7,824,287 | B2 * | 11/2010 | Nonoshita | B62M 9/10 474/160 |
| 7,850,564 | B2 * | 12/2010 | Nonoshita | B62M 9/105 474/152 |
| 7,967,709 | B2 * | 6/2011 | Emura | B62M 9/105 474/160 |
| 9,033,835 | B2 * | 5/2015 | Blank | B62M 9/10 474/152 |
| 9,297,452 | B2 * | 3/2016 | Iwai | B62M 9/00 |
| 9,302,736 | B2 * | 4/2016 | Iwai | B62M 9/10 |
| 9,440,706 | B2 * | 9/2016 | Iwai | B62M 9/105 |
| 9,829,085 | B2 * | 11/2017 | Iwai | F16H 55/303 |
| 10,302,184 | B2 * | 5/2019 | Yokozawa | F16H 55/06 |
| 10,377,445 | B2 * | 8/2019 | Hirose | B62M 9/12 |
| 10,808,824 | B2 * | 10/2020 | Sugimoto | B62M 9/105 |
| 10,830,329 | B2 * | 11/2020 | Hirose | B62M 9/00 |
| 11,009,112 | B2 * | 5/2021 | Moore | B22D 21/007 |
| 11,292,555 | B2 * | 4/2022 | Akanishi | F16H 55/12 |
| 11,332,214 | B2 * | 5/2022 | Zubieta Andueza | B62M 9/10 |
| 11,788,615 | B2 * | 10/2023 | Moore | B22D 21/007 474/152 |

(Continued)

*Primary Examiner* — Henry Y Liu

(57) ABSTRACT

A transmission sprocket is provided, including a sprocket body, an annular housing, and a chainring bump. The sprocket body is made of a first non-metallic material, and a radial outer edge of the sprocket body is provided with a plurality of chain teeth and a mounting hole. The annular housing is made of a second non-metallic material. The annular housing covers one side of the sprocket body and encloses an internal space together with the sprocket body, where the internal space surrounds an axis of the sprocket body. The chainring bump is disposed at the mounting hole. One of the sprocket body and the annular housing forms a rib in the internal space, the rib extends radially from the axis toward the chainring bump, and the rib abuts against the other of the sprocket body and the annular housing.

10 Claims, 4 Drawing Sheets

(56)            References Cited

U.S. PATENT DOCUMENTS

| | | | | |
|---|---|---|---|---|
| 11,845,514 | B2 * | 12/2023 | Buechner | B62M 9/10 |
| 12,060,928 | B2 * | 8/2024 | Moore | B22D 21/007 |
| 12,377,935 | B2 * | 8/2025 | Buechner | B62M 9/10 |
| 12,510,145 | B2 * | 12/2025 | Moore | B22D 21/007 |
| 2003/0139240 | A1 * | 7/2003 | Chen | F16D 1/112 474/170 |
| 2003/0199351 | A1 * | 10/2003 | Nichols | B62M 9/10 474/95 |
| 2005/0032596 | A1 * | 2/2005 | Nonoshita | B62K 19/16 474/178 |
| 2005/0282672 | A1 * | 12/2005 | Nonoshita | B62M 9/105 474/174 |
| 2006/0205549 | A1 * | 9/2006 | Nonoshita | B62M 9/105 474/160 |
| 2007/0129193 | A1 * | 6/2007 | Nonoshita | B62M 9/10 474/160 |
| 2007/0265122 | A1 * | 11/2007 | Emura | B62M 9/105 474/152 |
| 2008/0202284 | A1 * | 8/2008 | Valle | B62M 3/00 74/594.1 |
| 2013/0087013 | A1 * | 4/2013 | Sugimoto | B62M 9/105 74/594.2 |
| 2013/0143704 | A1 * | 6/2013 | Blank | B62M 9/10 474/152 |
| 2013/0291678 | A1 * | 11/2013 | Valle | B62M 9/105 74/594.2 |
| 2014/0206486 | A1 * | 7/2014 | Fuchs | F16H 55/14 474/152 |
| 2014/0335987 | A1 * | 11/2014 | Iwai | B62M 9/10 474/152 |
| 2015/0094179 | A1 * | 4/2015 | Iwai | B62M 9/00 474/152 |
| 2015/0217834 | A1 * | 8/2015 | Iwai | B62M 9/10 474/152 |
| 2015/0362057 | A1 * | 12/2015 | Wesling | F16H 55/30 474/152 |
| 2016/0096587 | A1 * | 4/2016 | Bachman | B62M 6/70 180/219 |
| 2016/0153541 | A1 * | 6/2016 | Fuchs | F16H 55/30 474/152 |
| 2016/0347409 | A1 * | 12/2016 | Watarai | B62M 9/02 |
| 2017/0284528 | A1 * | 10/2017 | Yokozawa | F16H 55/06 |
| 2017/0292598 | A1 * | 10/2017 | Moore | B22D 21/007 |
| 2018/0079467 | A1 * | 3/2018 | Hirose | F16H 55/30 |
| 2018/0194431 | A1 * | 7/2018 | Iwai | F16H 55/06 |
| 2019/0277386 | A1 * | 9/2019 | Hirose | F16H 55/06 |
| 2019/0293165 | A1 * | 9/2019 | Moore | B22D 21/007 |
| 2020/0040979 | A1 * | 2/2020 | Akanishi | B62M 9/00 |
| 2020/0122805 | A1 * | 4/2020 | Zubieta Andueza | F16H 55/30 |
| 2020/0346713 | A1 * | 11/2020 | Iwai | F16H 55/30 |
| 2022/0169337 | A1 * | 6/2022 | Buechner | B62M 9/10 |
| 2024/0067300 | A1 * | 2/2024 | Buechner | B62M 9/10 |

* cited by examiner

TRANSMISSION SPROCKET

FIELD OF THE INVENTION

The present disclosure relates to a sprocket, particularly a transmission sprocket used in a bicycle in conjunction with a chain to transmit power.

BACKGROUND OF THE INVENTION

Since the invention of the bicycle, its design has undergone many changes and evolved to include a speed change mechanism. Since the weight of the bicycle imposes an additional energy consumption to the rider, how to reduce the weight of the bicycle in a case of keeping the speed change mechanism has become an important project about the bicycle.

To reduce the weight of the bicycle, the weight of the bicycle body can be reduced by changing the types of materials of the bicycle body. The weight of the bicycle body can also be reduced by improving the structure of the bicycle body. Due to the differing properties of materials, after the change of the types of materials of the bicycle body, the original design of the structure of the bicycle body may not provide sufficient strength for the bicycle body. Therefore, corresponding to the change in materials of the bicycle body, in part of the structure of the bicycle body that experiences significant stress, the relevant design of the speed change mechanism should also be correspondingly modified.

SUMMARY OF THE INVENTION

The present disclosure provides a transmission sprocket having the advantages of light weight and high structural strength.

To achieve the above advantages, an embodiment of the present disclosure provides a transmission sprocket, including: a sprocket body made of a first non-metallic material, where a radial outer edge of the sprocket body is provided with a plurality of chain teeth and at least one mounting hole; an annular housing made of a second non-metallic material, where the annular housing covers one side of the sprocket body and encloses an internal space together with the sprocket body, and the internal space surrounds an axis of the sprocket body; and a chainring bump disposed at the at least one mounting hole of the sprocket body. One of the sprocket body and the annular housing forms a rib in the internal space, the rib extends radially from the axis toward the chainring bump, and the rib abuts against the other of the sprocket body and the annular housing.

In an embodiment, the annular housing has a second disc wall opposite the sprocket body, and the second disc wall extends obliquely from a side close to the axis toward a direction away from the axis while gradually approaching the sprocket body.

In an embodiment, the second disc wall has a stepped structure and includes a plurality of first ring portions, and each first ring portion extends obliquely from the side close to the axis toward the direction away from the axis while gradually approaching the sprocket body.

In an embodiment, the second disc wall further includes a second ring portion, and the second ring portion is connected between adjacent two of the first ring portions and non-parallel to the first ring portions.

In an embodiment, one of the first ring portions is located at an outer edge of the annular housing.

In an embodiment, an outer edge of the annular housing has at least one notch, and the chainring bump penetrates through the notch.

In an embodiment, the ribs extend oppositely from the sprocket body and the annular housing respectively and abut against each other.

In an embodiment, the first non-metallic material and the second non-metallic material are the same material.

In an embodiment, the first non-metallic material and the second non-metallic material are different materials.

In an embodiment, the chainring bump is made of a non-metallic material.

Based on the above description, the transmission sprocket in embodiments of the present disclosure reduces weight by providing the internal space between the sprocket body and the annular housing. Moreover, since the rib extending radially toward the arrangement position of the chainring bump is provided in the internal space, when the chain presses against the chainring bump during speed changing, the transmission sprocket is less likely to deform, such that the transmission sprocket has the advantages of light weight and high structural strength.

Other objectives, features and advantages of the present disclosure will be further understood from the further technological features disclosed by the embodiments of the present disclosure wherein there are shown and described preferred embodiments of the present disclosure, simply by way of illustration of modes best suited to carry out the present disclosure.

DETAILED DESCRIPTION OF PREFERRED EMBODIMENTS

Figure 1:
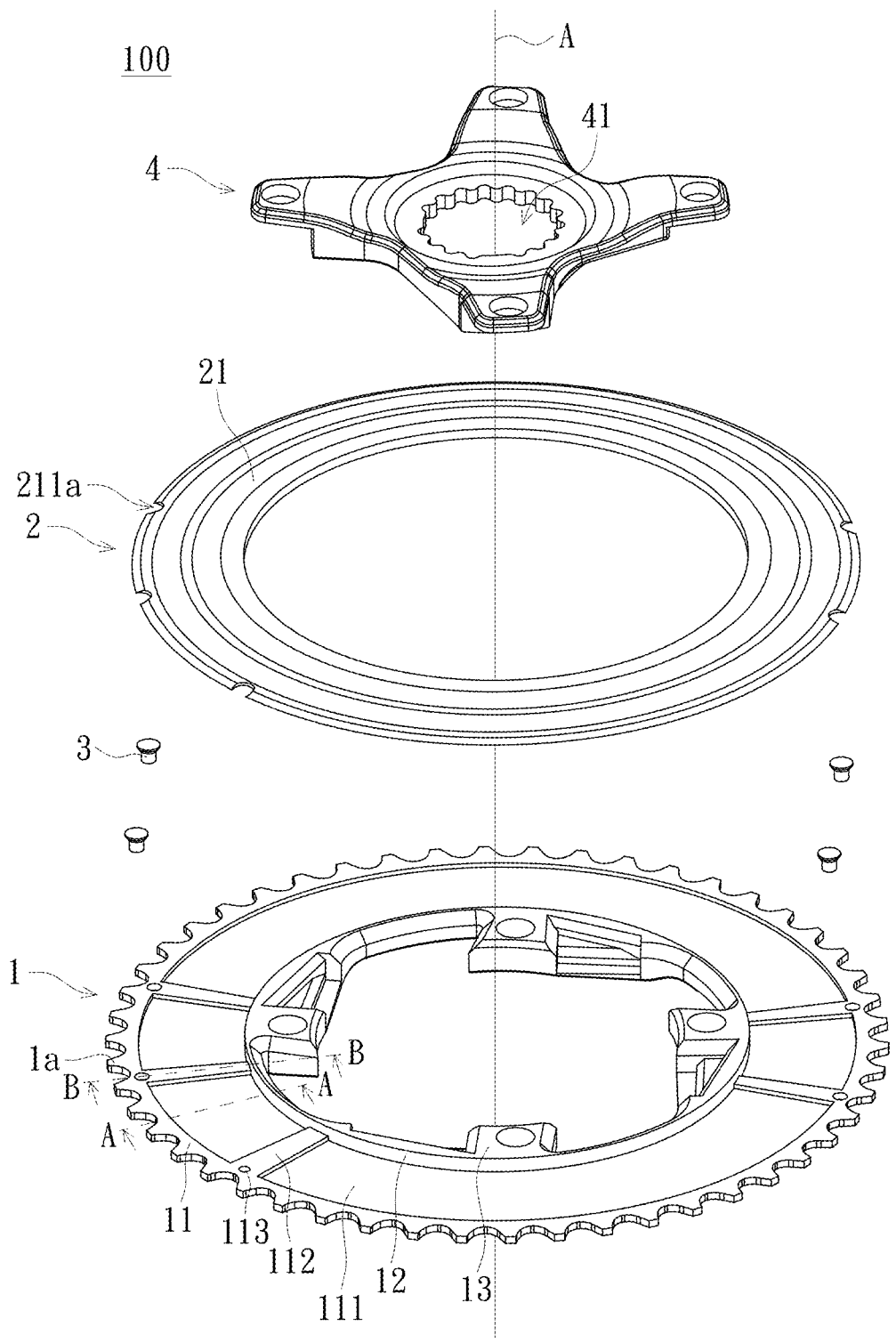
FIG. 1 is a schematic exploded diagram of a transmission sprocket according to an embodiment of the present disclosure.

Terms used in the description of the embodiments of the present disclosure, for example, orientation or position relation such as "above" and "below" are described according to the orientation or position relation shown in the drawings. The above terms are used for facilitating description of the present disclosure rather than limiting the present disclosure, i.e., indicating or implying that the mentioned elements have to have specific orientations and to be configured in the specific orientations. In addition, terms such as "first" and "second" involved in the description or claims are merely used for naming the elements or distinguishing different embodiments or ranges rather than limiting the upper limit or lower limit of the quantity of the elements.

Figure 2:
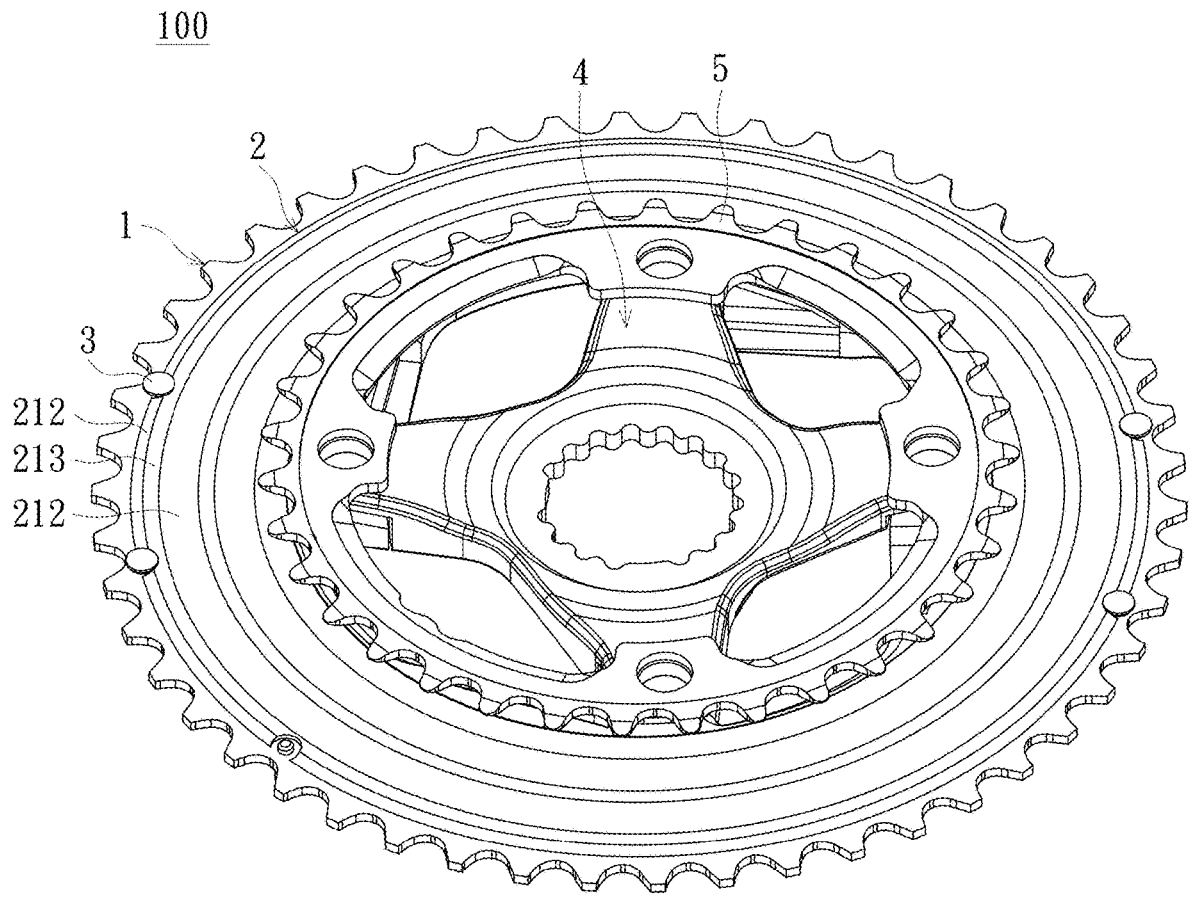
FIG. 2 is a schematic combination diagram of the transmission sprocket in FIG. 1.
Figure 3:
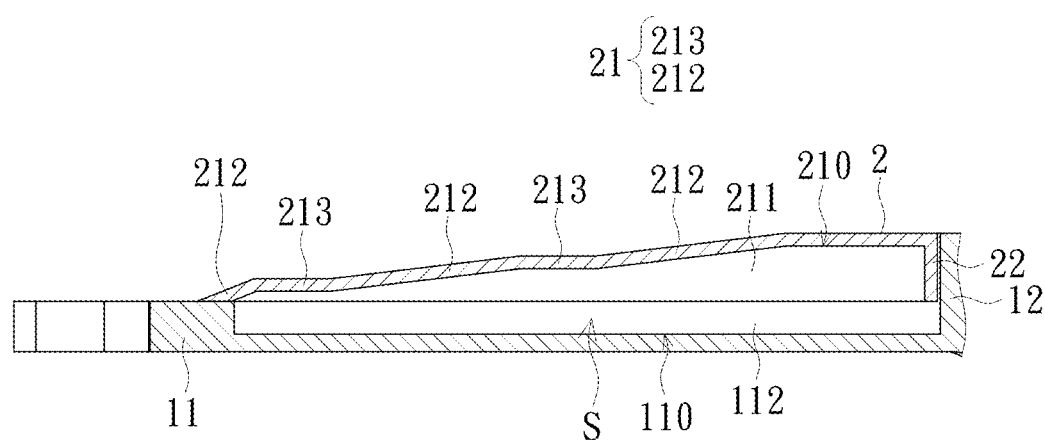
FIG. 3 is a schematic cross-sectional view, taken along section plane A-A in FIG. 1.
Figure 4:
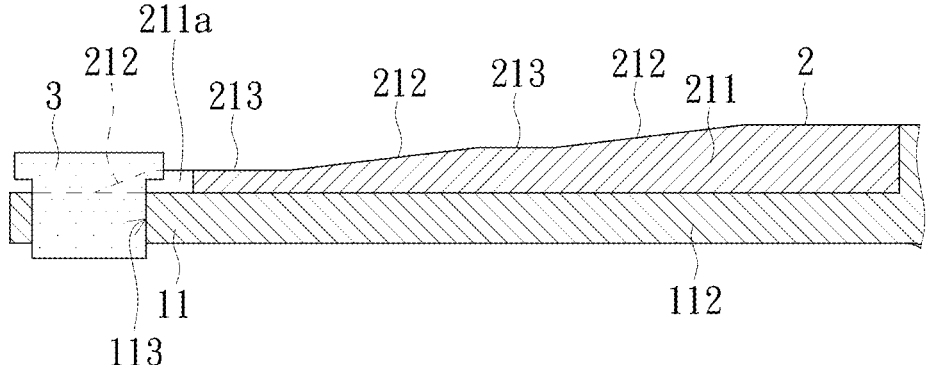
FIG. 4 is a schematic cross-sectional view, taken along section plane B-B in FIG. 1.
Figure 5:
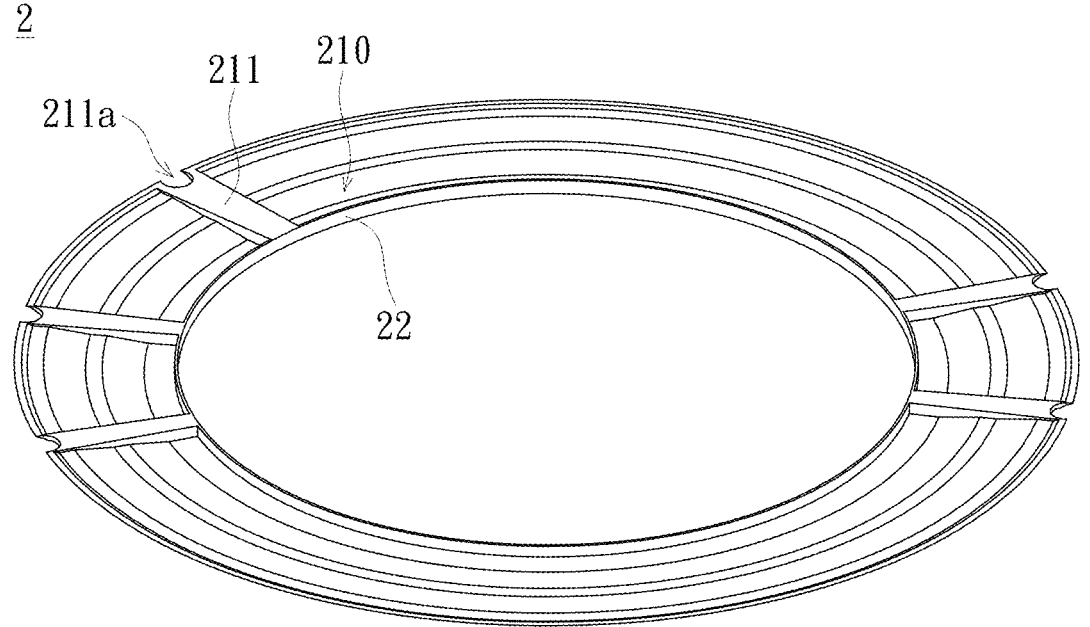
FIG. 5 is a schematic diagram of a back surface of an annular housing in FIG. 1.

FIG. 1 is a schematic exploded diagram of a transmission sprocket according to an embodiment of the present disclosure. FIG. 2 is a schematic combination diagram of the transmission sprocket in FIG. 1. FIG. 3 is a schematic cross-sectional view, taken along section plane A-A in FIG. 1. FIG. 4 is a schematic cross-sectional view, taken along section plane B-B in FIG. 1. FIG. 5 is a schematic diagram of a back surface of an annular housing in FIG. 1.

As shown in FIGS. 1 to 5, a transmission sprocket 100 in an embodiment of the present disclosure includes a sprocket body 1, an annular housing 2, and a chainring bump 3. The sprocket body 1 is made of a first non-metallic material, and a radial outer edge of the sprocket body 1 is provided with a plurality of chain teeth 1a and a mounting hole 113. The annular housing 2 is made of a second non-metallic material, where the annular housing 2 covers one side of the sprocket body 1 and encloses an internal space S together with the sprocket body 1, and the internal space S surrounds an axis A of the sprocket body 1. The chainring bump 3 is disposed at the mounting hole 113. One of the sprocket body 1 and the annular housing 2 forms ribs (refer to a rib 112 and a rib 211 in FIG. 3) in the internal space S. The ribs 112, 211 extend radially from the axis A toward the chainring bump 3, and the ribs 112, 211 abut against the other of the sprocket body 1 and the annular housing 2.

In this embodiment, an axis of the transmission sprocket 100 and an axis of the annular housing 2, for example, also coincide with the axis A.

In this embodiment, the chainring bump 3 is, for example, a rivet inserted into the sprocket body 1 and detachable from the sprocket body 1. The shape and material of the chainring bump 3 are not particularly limited. Specifically, the primary function of the chainring bump 3 is to provide an additional attachment point for the chain between the original sprocket and the target sprocket during movement between sprockets, thereby facilitating a smooth chain shifting process. Thus, there is no limitation on the chainring bump 3 as long as it can protrude from the sprocket surface with a sufficient axial length. The material of the chainring bump 3 is, for example, metal, but is not limited thereto. It may alternatively be a non-metallic material such as fiber composite material or polymer material that is wear-resistant and meets strength needs. In an embodiment similar to that of FIG. 1 with a plurality of chainring bumps 3, the shapes of different chainring bumps 3 may vary.

In this embodiment, the transmission sprocket 100, for example, further includes a claw portion 4, where the claw portion 4 is used, for example, to connect with a bicycle crank (not shown in the figure) and an auxiliary sprocket 5 (see FIG. 2). The claw portion 4, for example, has a cross shape, but there is no particular limitation. The center of the claw portion 4 is located on the axis A and has a connection hole 41 suitable for connecting to the bicycle crank. The material of the claw portion 4 is not particularly limited and may include common materials such as steel, iron, fiber composite material, polymer composite material, aluminum alloy, and titanium alloy, where an appropriate material may be selected based on usage environment needs.

As shown in FIG. 2, the auxiliary sprocket 5 is, for example, a sprocket with a diameter smaller than that of the transmission sprocket 100. When the auxiliary sprocket 5 and the transmission sprocket 100 are assembled, the auxiliary sprocket 5 is, for example, mounted on the side of the transmission sprocket 100 close to the bicycle frame (not shown in the figure). The material of the auxiliary sprocket 5 may be selected based on needs. In an embodiment not shown in the figure, the structure of the auxiliary sprocket 5 may be similar to that of the transmission sprocket 100.

As shown in FIGS. 1 to 3, the sprocket body 1 is made of a first non-metallic material, and the first non-metallic material may be integrally formed from carbon fiber material, but is not limited thereto. It may alternatively be other types of fiber composite materials or polymer materials that meet strength needs. The sprocket body 1 is, for example, located on the side of the transmission sprocket 100 away from the bicycle frame when the transmission sprocket 100 and a bicycle frame are assembled. The sprocket body 1, for example, has an annular shape and includes a first disc wall 11, a first annular wall 12, and a plurality of fixing portions 13.

As shown in FIGS. 1 and 3, in this embodiment, the first disc wall 11 has a first disc surface 110 on the side (which, in this embodiment, is also a side of the sprocket body 1 facing the bicycle frame) facing the annular housing 2. A normal direction of the first disc surface 110 is, for example, parallel to the axis A.

In this embodiment, the first disc wall 11 has a plurality of grooves 111 with openings on the first disc surface 110. The rib 112 is formed between two grooves 111. The first disc surface 110 is, for example, a bottom surface of the grooves 111.

Follow the above. The first disc wall 11 also has a mounting hole 113 suitable for assembling with the chainring bump 3. The position of the mounting hole 113 is, for example, on the extension line of the rib 112, adjacent to the groove 111, and closer to axis A than the chain teeth 1a. The chain teeth 1a of the sprocket body 1 are, for example, located at an outer peripheral edge of the first disc wall 11.

In this embodiment, the first annular wall 12 is located at an inner peripheral edge of a ring of the first disc wall 11. The first annular wall 12, for example, protrudes from the surface of the first disc surface 110 toward the annular housing 2 along an extension direction parallel to the axis A of the transmission sprocket 100. An outer side wall surface of the first annular wall 12 (a wall surface of the first annular wall 12 facing a side away from the axis A) is, for example, perpendicular to the first disc surface 110, but is not limited thereto.

The fixing portions 13 are, for example, a plurality of blocks protruding from an inner side wall surface of the first annular wall 12 (a wall surface of the first annular wall 12 facing a side of the axis A) toward the axis A of the transmission sprocket 100. The number of fixing portions 13, for example, corresponds to the number of endpoints of the claw portion 4, and the shape of the fixing portions 13, for example, corresponds to the shape of the endpoints of the claw portion 4.

When the sprocket body 1 and the claw portion 4 are assembled, each endpoint of the claw portion 4 is connected to the fixing portion 13 of the sprocket body 1. The connection method between the fixing portions 13 and the claw portion 4 is not limited, such as screwing with fasteners or bonding with an adhesive, which may be set based on needs. The shape of the sprocket body 1 may be set based on needs, and in an embodiment not shown in the figure, the sprocket body 1 and the claw portion 4 may be integrally formed.

As shown in FIGS. 1 to 5, specifically, the annular housing 2 is made of a second non-metallic material, and the second non-metallic material may be integrally formed from carbon fiber material, but is not limited thereto. It may alternatively be other fiber composite materials or polymer materials that meet strength needs. In addition, depending on the usage environment, the first non-metallic material and the second non-metallic material may be the same material, or different materials may be selected based on varying strength needs. In this embodiment, an outer diameter and an inner diameter of the annular housing 2 are, for example, respectively less than an outer diameter and an inner diameter of the sprocket body 1. During mounting, the annular housing 2 is, for example, positioned relative to the sprocket body 1 on the side of the transmission sprocket 100 close to the bicycle frame. The annular housing 2, for example, has an annular shape. The annular housing 2 includes a second disc wall 21 having an annular shape and a second annular wall 22 located at the inner edge of the annular housing 2.

As shown in FIGS. 1 to 5, in this embodiment, the second disc wall 21 has a second disc surface 210 on the side facing the sprocket body 1. The second disc wall 21, for example, extends obliquely, toward a direction away from the axis A, from the side of the second annular wall 22 away from the sprocket body 1 and from the side close to axis A, gradually approaching the sprocket body 1. The size of the second disc wall 21 is set, for example, to completely cover each groove 111 on the sprocket body 1 when the sprocket body 1 and the annular housing 2 are assembled.

As shown in FIGS. 2 and 3, in this embodiment, the second disc wall 21, for example, has a stepped structure, forming a stepped surface on the side opposite the second disc surface 210. The second disc wall 21 with a stepped structure includes a plurality of first ring portions 212 and a plurality of second ring portions 213. For example, three first ring portions 212 are provided, with one of the first ring portions 212 located at the outer edge of the annular housing 2. Each first ring portion 212 extends obliquely from the side close to the axis A toward a direction away from the axis A, gradually approaching the side of the annular housing 2 close to the sprocket body 1. The inclination angles of different first ring portions 212 may vary. For example, in this embodiment, an inclination angle of the first ring portion 212 at the outer edge of the annular housing 2 is greater than those of the other two first ring portions 212.

As shown in FIGS. 2 and 3, for example, two second ring portions 213 are provided. Each second ring portion 213 is connected between two adjacent first ring portions 212, and the extension direction of the second ring portion 213 is not parallel to the extension direction of the first ring portions 212. In this embodiment, on the surface opposite the second disc surface 210, the surfaces of different second ring portions 213 are, for example, parallel to each other and extend toward the direction of the axis A, but are not limited thereto. With this structure, when a bicycle equipped with the transmission sprocket 100 changes the speed, a chain (not shown in the figure) can gradually move along the surface of the second disc wall 21 on the side away from the sprocket body 1 in the extension direction of the axis A.

Since the present disclosure does not limit the shape of the second disc wall 21, the stepped structure may be changed to a continuous curved surface structure or an inclined structure in other embodiments of the present disclosure. This allows the chain (not shown in the figure) to gradually move along the second disc wall 21 in the extension direction of the axis A.

As shown in FIG. 3, the second annular wall 22, for example, extends from the inner edge of the second disc surface 210 along the extension direction parallel to the axis A of the transmission sprocket 100 toward the side where the sprocket body 1 is located, suitable for contacting the first annular wall 12 when the annular housing 2 and the sprocket body 1 are assembled.

As shown in FIG. 3, during assembly, the first annular wall 12 and the second annular wall 22 contact each other, and the portion of the first disc wall 11 near the outer peripheral edge also contacts an outer peripheral edge of the second disc wall 21. Since in this embodiment, an inner side wall surface of the second annular wall 22 (a wall surface of the second annular wall 22 facing a side close to the axis A) fits with the outer side wall surface of the first annular wall

12, the internal space S is defined jointly by the first disc surface 110, the second disc surface 210, and the second annular wall 22, but this may be set based on needs. As can be seen from FIG. 3, the distance between the first disc surface 110 and the second disc surface 210 gradually decreases from the first annular wall 12 along the radial direction toward a direction away from the axis A.

As shown in FIG. 3, the detailed connection method between the sprocket body 1 and the annular housing 2 may be set based on needs, for example, by heating to melt the contacting portions of the sprocket body 1 and the annular housing 2 to bond them together, or by providing adhesive therebetween.

Since the size relationship between the annular housing 2 and the sprocket body 1 is not particularly limited, depending on the relative size relationship between the first annular wall 12 and the second annular wall 22, in an embodiment not shown in the figure, the internal space S may be jointly defined by the first disc surface 110, the second disc surface 210, and the first annular wall 12.

As shown in FIGS. 2, 4, and 5, in this embodiment, the outer edge of the annular housing 2 has a notch 211*a* penetrating the annular housing 2 in a direction parallel to the axis A. During assembly of the components, the chainring bump 3 passes through the notch 211*a* and is detachably inserted into the mounting hole 113 of the sprocket body 1. Through such construction, after assembly, the chainring bump 3 protrudes from the surface of the outermost first ring portion 212, suitable for assisting the chain in engaging with the chain teeth 1*a* during gear shifting.

The size of the chainring bump 3 may be set based on needs. For example, as shown in FIGS. 2 and 4, in this embodiment, when the chainring bump 3 is disposed on the sprocket body 1, in the direction parallel to the extension direction of axis A, the chainring bump 3 protrudes not only from the surface of the first ring portion 212 at the outer edge of the annular housing 2 but also from the surface of the second ring portion 213 near the outer edge of the annular housing 2.

As shown in FIGS. 2 and 4, in this embodiment, since the chainring bump 3 has a mushroom-shaped profile, in the radial direction of the transmission sprocket 100, the chainring bump 3 partially covers not only the surface of the first ring portion 212 at the outermost edge of the annular housing 2 but also the surface adjacent to the second ring portion 213, without covering the surfaces of the other first ring portions 212.

As shown in FIGS. 3 and 5, in this embodiment, the sprocket body 1 and the annular housing 2 respectively form the opposite rib 112 and rib 211 on the sides facing the internal space S. These ribs (the rib 112 and rib 211) radially extend along the bicycle transmission sprocket 100 and abut against each other when the sprocket body 1 and the annular housing 2 are connected. The internal space S is divided into a plurality of sub chambers by these ribs (the rib 112 and rib 211).

Regarding the rib in the internal space S, specifically, as shown in FIG. 1, the rib 112 of the sprocket body 1 is, for example, formed between two grooves 111 of the first disc wall 11, with the top surface of the rib 112, for example, aligned with the first disc surface 110. As shown in FIG. 5, the rib 211 of the annular housing 2 is, for example, formed between the second disc surface 210 and the second annular wall surface, and, for example, positioned opposite the rib 112 of the sprocket body 1.

It should be understood that the detailed shapes of the rib 112 and rib 211 may be set based on needs. For example, in an embodiment not shown in the figure, the sprocket body 1 may lack grooves 111 and thus lack the rib 112, such that the rib 211 of the annular housing 2 directly abuts the first disc surface 110. In another embodiment, the annular housing 2 may lack the rib 211, while the rib 112 of the sprocket body 1 may protrude from the first disc surface 110 and abut the second disc surface 210 when the sprocket body 1 and the annular housing 2 are assembled.

Based on the above description, the transmission sprocket of the present disclosure reduces weight by providing the internal space between the sprocket body and the annular housing. Moreover, since the rib extending radially toward the arrangement position of the chainring bump is provided in the internal space, when the chain presses against the chainring bump during speed changing, the transmission sprocket is less likely to deform, such that the transmission sprocket has the advantages of light weight and high structural strength.

In addition, since the annular housing has the stepped structure, during speed changing, the chain can move gradually along the surface of the annular housing and, after passing the chainring bump, smoothly engage with the teeth of the sprocket body.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A transmission sprocket, comprising:
a sprocket body, made of a first non-metallic material, wherein a radial outer edge of the sprocket body is provided with a plurality of chain teeth and at least one mounting hole;
an annular housing, made of a second non-metallic material, wherein the annular housing covers one side of the sprocket body and encloses an internal space together with the sprocket body, and the internal space surrounds an axis of the sprocket body; and a chainring bump, disposed at the at least one mounting hole;
wherein one of the sprocket body and the annular housing forms a rib in the internal space, the rib extends radially from the axis toward the chainring bump, and the rib abuts against the other of the sprocket body and the annular housing.

2. The transmission sprocket according to claim 1, wherein the annular housing has a second disc wall opposite the sprocket body, and the second disc wall extends obliquely from a side close to the axis toward a direction away from the axis while gradually approaching the sprocket body.

3. The transmission sprocket according to claim 2, wherein the second disc wall has a stepped structure and comprises a plurality of first ring portions, and each first ring portion extends obliquely from the side close to the axis toward the direction away from the axis while gradually approaching the sprocket body.

4. The transmission sprocket according to claim 3, wherein the second disc wall further comprises at least one second ring portion, and the at least one second ring portion is connected between adjacent two of the first ring portions and non-parallel to the first ring portions.

5. The transmission sprocket according to claim 3, wherein one of the first ring portions is located at an outer edge of the annular housing.

6. The transmission sprocket according to claim 1, wherein an outer edge of the annular housing has at least one notch, and the chainring bump penetrates through the notch.

7. The transmission sprocket according to claim 1, wherein the ribs extends oppositely from the sprocket body and the annular housing and abut against each other.

8. The transmission sprocket according to claim 1, wherein the first non-metallic material and the second non-metallic material are a same material.

9. The transmission sprocket according to claim 1, wherein the first non-metallic material and the second non-metallic material are different materials.

10. The transmission sprocket according to claim 1, wherein the chainring bump is made of a non-metallic material.

* * * * *